H. B. LAYMAN.
CONNECTING ROD.
APPLICATION FILED APR. 3, 1917.

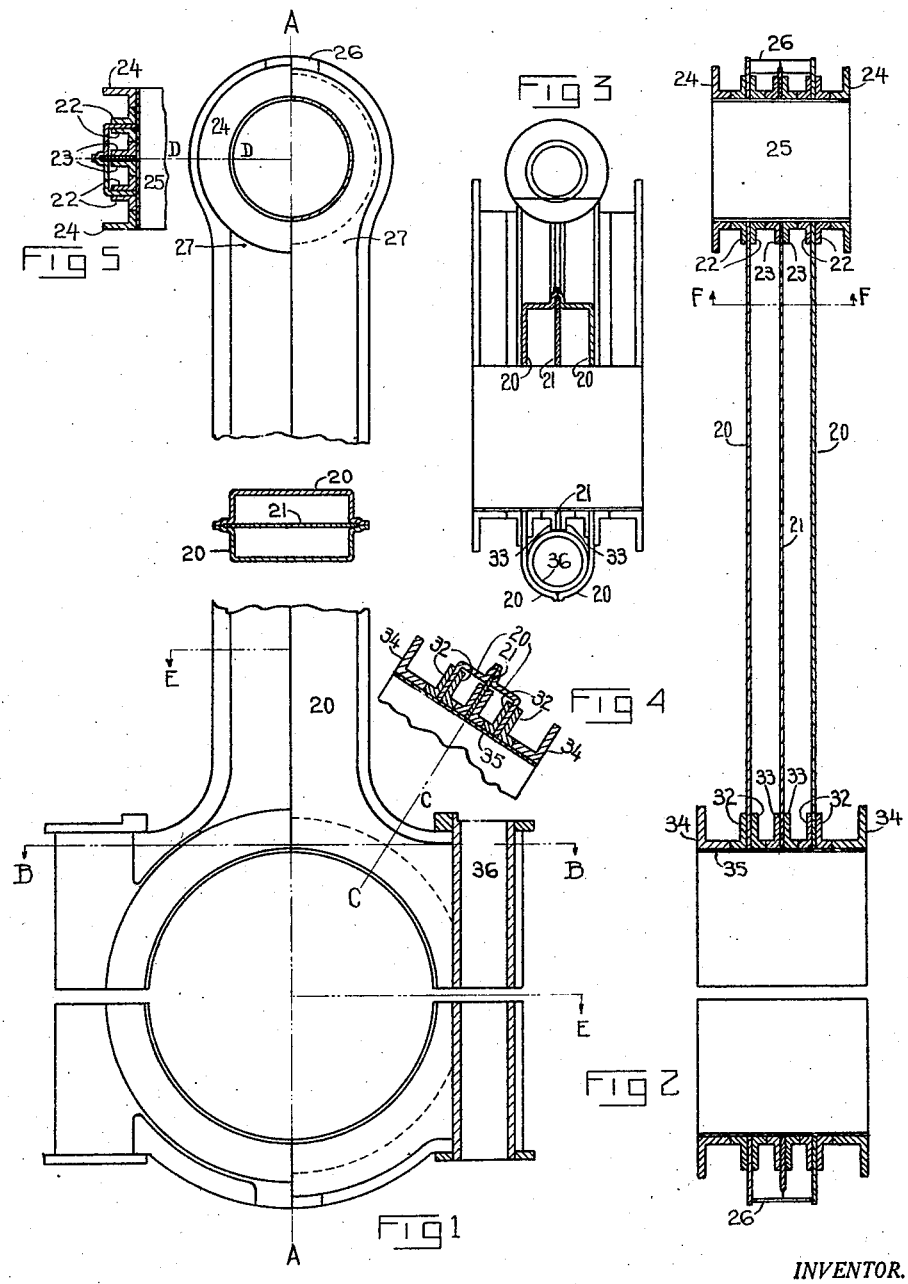

1,418,085.

Patented May 30, 1922.
3 SHEETS—SHEET 2.

INVENTOR.
Hebron B Layman
BY
Kerr Page Cooper & Hayward
ATTORNEYS.

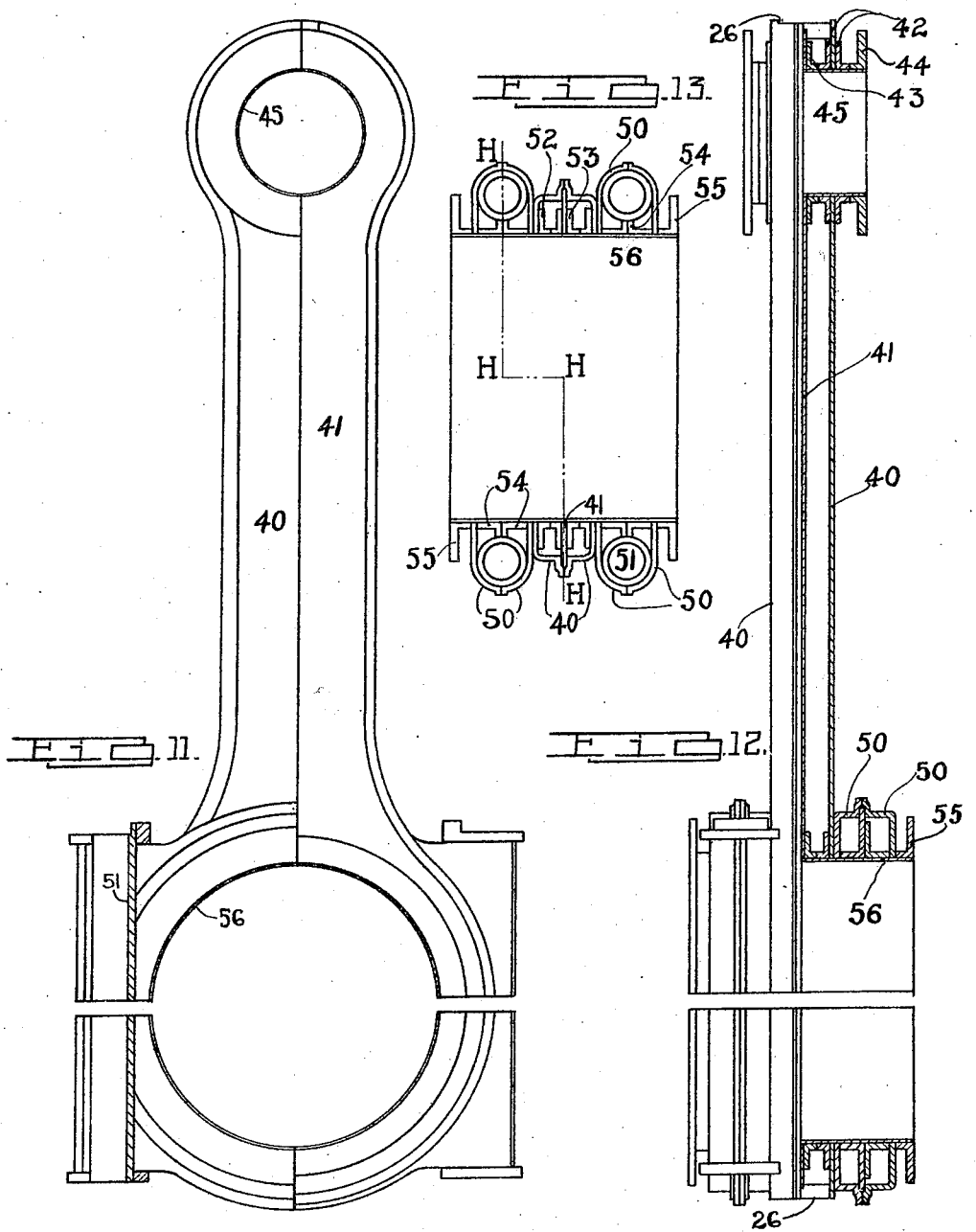

UNITED STATES PATENT OFFICE.

HEBRON BERNARD LAYMAN, OF NEW YORK, N. Y., ASSIGNOR TO THE LAYMAN PRESSED ROD COMPANY, INC., OF NEW YORK, N. Y., A CORPORATION OF NEW YORK.

CONNECTING ROD.

1,418,085.      Specification of Letters Patent.      Patented May 30, 1922.

Application filed April 3, 1917. Serial No. 159,398.

*To all whom it may concern:*

Be it known that I, HEBRON BERNARD LAYMAN, a citizen of the United States, residing at New York, county of New York, and State of New York, have invented certain new and useful Improvements in Connecting Rods, of which the following is a full, clear, and exact description.

This invention relates to built-up connecting rods, links, levers and the like, especially sheet metal connecting rods, and is an improvement upon the invention disclosed in my Patent 1,226,978.

The purpose of this invention is to facilitate and cheapen the manufacture of sheet metal connecting rods; to strengthen the crank and piston pin bosses thereof; to cut down the weight of the piston pin end, and hence the reciprocating mass; to strengthen the rod materially at the junction of the shank with the piston pin and crank pin bosses; to provide a form of piston and crank pin boss, the width of which may be varied independently of the rod body sections; to improve the junction of the bolt bosses with the crank pin boss; to enable the use of very rigid, non-ductile metal in the crank and piston pin bosses; to enable the use of very stiff or rigid or non-ductile metal in the rod, by incorporating it in the form of an auxiliary plate between the body sections; to enable the use in the rod body shell of very thin or ductile steel and the softer and lighter metals other than steel, such as aluminum and magnesium and their alloys, which is accomplished by the incorporation of a load-carrying intermediate or internal structure or skeleton, comprising an auxiliary plate, to which are united the members composing the crank and piston pin bosses and the bolt bosses. Another object is to provide a connecting rod with hollow head ends, such as shown in my co-pending application 135,603 filed Dec. 2nd, 1916, but of improved construction. Other objects will appear hereafter in the specification and claims, clearly discernible to those skilled in the art.

By way of example only, I show in

Fig. 1 a side elevation, half in section, of a connecting rod embodying features of the invention.

Fig. 2 is an elevation in section on the line A—A of Fig. 1.

Fig. 3 is a view on the line E—E of Fig. 1.

Fig. 4 is a broken section on the line C—C of Fig. 1.

Fig. 5 is a broken section on the line D—D of Fig. 1.

Fig. 8 is a detail in plan and end elevation of the bushing forming part of the crank pin boss hereafter referred to.

Fig. 9 is a plan and end elevation of an auxiliary internal reinforcing plate, shown in all of the previous figures and hereafter particularly dealt with.

Fig. 11 shows an elevation of another form of connecting rod, shown sectioned on the line H—H of Fig. 13.

Fig. 12 is a side elevation, half in section, of the rod in Fig. 11.

Fig. 13 is a view of the abutting face of either the rod or cap of Figs. 11 and 12.

Figure 9:
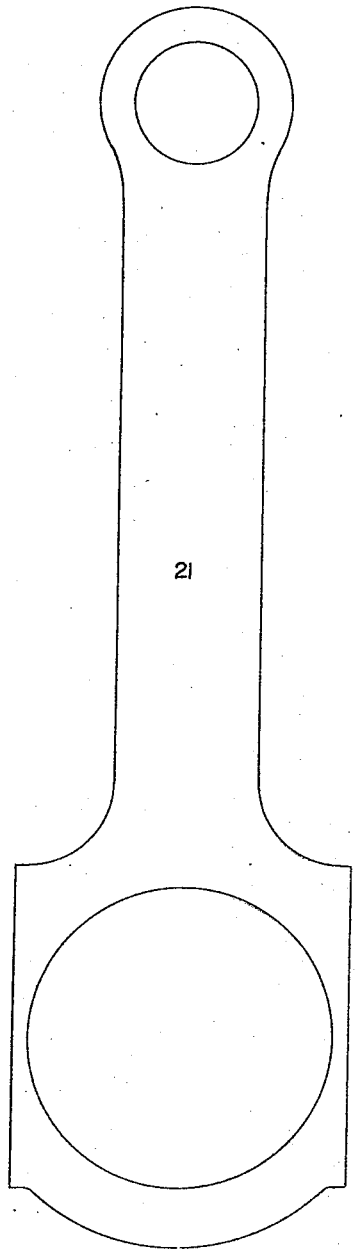
Figure 6:
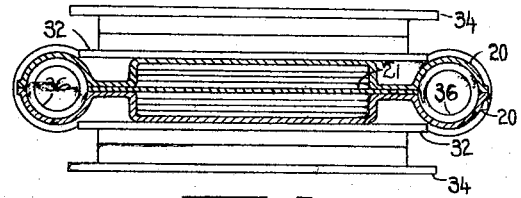
Fig. 6 is a section on the line B—B of Fig. 1.

In Figs. 1 to 7 inclusive, 20 are two substantially similar rod body sections, which, when united, form a connecting rod shell. These are made from especially thin-gauged, soft, ductile metal. Between the sections and united thereto, is a reinforcing plate 21, preferably of relatively very stiff or non-ductile metal. The outline of this plate is of the profile of the shell at the piston pin end and along the shank end, and generally so at the crank head end. This reinforcing plate 21 is shown in detail at Fig. 9.

The rod body sections 20 are drawn or formed at one end to compose a hollow cylindrical boss without integral cuffs extending from the side walls, but with the side walls apertured to receive a piston pin, as clearly shown in Figs. 1 to 5. To the outer and inner face of each side wall of this boss are secured similar flanged cuffs or bushings 22, which are preferably of material possessing the chief characteristics of high carbon or alloy steel viz: great rigidity and high tensile strength. To the auxiliary reinforcing plate 21 are secured similar flanged cuffs or bushings designated 23. At each end of the piston pin boss and forming part thereof, is a cuff or bushing 24 having flanges somewhat larger than those of bushings 22 and 23. All of these bushings I prefer to make of high carbon or alloy steel or of material possessing similar characteristics, and as such metal is not easily machined, I employ a liner bushing 25, preferably of much softer material, which I use as a tubular rivet, spinning the ends over to secure the several flanged bushings to the rod shell.

In the course of manufacture, after all the bushings, including those of the crank end hereafter referred to, are assembled to the rod, all of the parts are welded, brazed or fused together by immersion in a molten alloy of metals, and subsequently "heat-treated." Thereafter, the piston pin boss liner bushing 25 of soft material is partly or completely machined away, both in its diameter and at its ends. At the extreme ends of the rod are apertures 26, which serve as means for the free ingress and egress of spelter in the course of welding, brazing or fusing referred to. These openings also provide a means for oiling the crank and piston pin bearings if desired. It will be observed that the auxiliary reinforcing plate 21 bridges the channel in the piston pin boss, which is provided for the free ingress and egress of spelter and securely unites the cylindrical or end wall of the piston pin boss with the bushings 23.

The idea of a sheet metal connecting rod with a hollow piston pin head and a channel therethrough for the free flow of molten metal in the process of welding, brazing or fusing, was described by me in my co-pending application No. 135,603. However, at points corresponding to those designated 27 in the present Fig. 1, the rod shown in my earlier application possessed a minor defect which is here remedied. There was a cantilever at the points designated 27 which is here overcome by the presence of the plate 21, which bridges these points 27, and unites the piston pin boss with the end wall of the shell, so that the impact on the piston pin is transmitted to the crank pin by a column or straight wall of rigid metal, in which a cantilever is nowhere present. Similar zones or points which existed at the junction of the shank and crank pin bosses are here similarly overcome.

In my earlier disclosure, U. S. Patent No. 1,226,978, as distinguished from the present invention, the piston pin boss was formed by drawn cuffs integral with the rod body sections, and were designated there in Fig. 1 as "b". These cuffs comprising the piston pin boss are required to sustain intense loads, and if they were tied to the body sections by radii instead of sharp corners, the piston pin boss would bed down in service until sharp corners were actually formed. This, of course, means a change of center distance of the crank and piston pin bosses.

Where I have made rods with integral cuffs forming piston and crank pin bosses, I have obtained the required sharp corners by first drawing the cuff, or by piercing a hole and then "spreading" the metal as described in a co-pending application, Serial No. 87484, filed March 29th, 1916, and then "restriking" the end of the cuff, forcing the metal back into the desired sharp corner. This, however, somewhat weakens the material in the shell, and though the metal is afterwards annealed and heat treated, the hurtful effect is never entirely overcome, hence such a connecting rod shell with a wall of substantially uniform thickness may, when tested, develop a fracture at the junction of the crank pin boss and the shell. I have sought to overcome this by the addition of supplementary members placed within the hollow shank of the rod, and uniting the piston pin boss bushings to the side wall of the shank, thus bridging the weakened zone; but this adds weight to the piston pin end. The present invention is an improvement. As I have shown, the flanged cuffs or bushings 22 are united directly to the side walls of the rod by a comparatively great contacting area and welded brazed or fused thereto, thus permitting the elimination of the shank interior reinforcement mentioned.

At the crank pin end of the rod, the side walls of the crank boss are fitted with flanged cuffs 32, and the plate reinforcement with flanged cuffs 33; the width of the boss is completed by flanged cuffs 34. As at the piston pin boss, these are secured together by means of the liner bushing 35, which is similarly partly or completely machined away in the course of finishing the rod.

Figure 8:
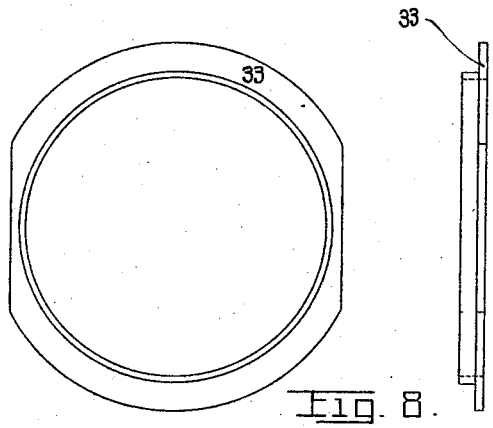

The flanges of the flanged cuffs or bushings 33 are cut away at the sides as clearly shown in Figs. 1 and 8 to present a line of contact, and the bolt boss liner bushings or thimbles 36 are united thereto. By this means the construction of the crank head end of the rod is very greatly improved, for, as distinguished from my previous invention, the tension of the bolts comes through the thimbles 36 directly upon the flanges 33, and so immediately upon the crank pin bearing, not here shown, and does not or need not be taken either in part or at all by the shell.

It will be seen that these flanges 33 together with the flanges 32, form a series of substantial reinforcements around the crank pin boss right at the zone of thrust. They also prevent the boss from going out-of-round in service, and effectually radiate the heat generated in the crank pin bearing.

In the rod of my earlier Patent No. 1,226,978, the load upon the piston pin boss is transmitted to the crank pin boss by the walls of the hollow shank of the rod shell. In the present invention the major part of the load is carried by the interior auxiliary reinforcement 21. This reinforcement I prefer to make of steel having very high tensile strength, such as nickel, or chromium, or in some cases high carbon steels or of metal having the chief characteristics of such steels; in fact, I prefer to make this plate of such metals as cannot be drawn or formed commercially into the shapes demanded of the rod shell. But these metals can be sheared or blanked, and so I incorporate in my improved rod, rigid, stiff, non-ductile, high tensile metals in the form of the plate 21 secured to and between the body sections.

I previously pointed out that the bushings 23 of the piston end and 33 of the crank end are permanently united to the plate 21, as are also the bolt boss thimbles 36. Taken together, these parts compose a skeleton for a load-carrying structure of tremendous strength, so that the body sections 20 may be made of extremely thin-gauged ductile steel, or, equally feasibly, of some of the aluminum or magnesium alloys, in which later case the inner members form the load-carrying structure, and the principal function of the non-ferrous formed metal members composing the shell, is to lend form and comeliness.

In making these body sections 20 of thin and very ductile material, such as aluminum or very low carbon steels, I am enabled to use very light and relatively cheap material, and to form the body sections without annealing between the several operations; and, in fact, am able to decrease the number of press operations otherwise required.

Figure 10:
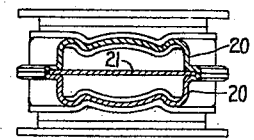
Fig. 10 is a view like Fig. 7, but showing a modification.
Figure 7:
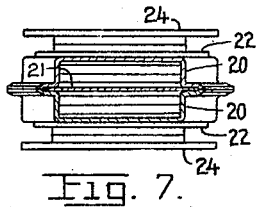
Fig. 7 is a section on the line F—F of Fig. 2.

Fig. 10 is a section like Fig. 7 but of a rod having a shank with corrugated or ribbed side walls. Accordingly the flanged bushings corresponding to 22 and 23 of Fig. 5 are ribbed.

In Figs. 11 to 13 inclusive, is shown a rod provided with a cap of four-bolt construction. Such construction is necessary or desirable where the crank pin bearing is of great width. 40 are body sections, 41 an internal auxiliary reinforcing plate, 42, 43, 44 and 45 are bushings which correspond with 22, 23, 24 and 25 of Fig. 5.

To the body sections 40 are secured formed bolt boss members 50, two of which together form a bolt boss having a liner bushing 51. To the inner walls of the hollow crank pin boss are secured flanged bushings 52, and to the reinforcing plate are united flanged bushings 53. Within the space between the bolt boss members are flanged bushings 54, which unite with the bolt boss liner bushings 51, and form substantial circumferential braces for the crank pin boss. Finally, bushings 55 complete the length of the crank pin boss, and the liner bushing 56 secures all of these parts together.

While I have shown in the accompanying drawings a connecting rod shell composed of two similar parts abutting at right angles to the crank and piston pin axes, it must be clearly understood that I may apply the invention to rods of a class described in Patent No. 1,218,572, issued to me March 6th, 1917. Also the invention is not restricted to connecting rods with caps, nor is it limited to a connecting rod having a shell comprised of a plurality of parts. I have described and claimed a connecting rod shell formed from a single piece of sheet metal in my Patent 1,260,557. Further, I do not limit myself to connecting rod shells having integral ends.

Heretofore, I have used the word "shell" in referring to the main part of the connecting rod. By "shell" I mean the shank portion and one or both end portions integral therewith, exclusive of cap or flanged bushings, or liner bushings, or bolt boss bushings, or shank reinforcement, or similar small parts.

My use of the word "shell" will apply with equal force to connecting rods with or without caps. Rods of the latter class I have described in U. S. Patent No. 1,176,300.

Where I use the term "sheet metal" hereinafter in the claims, I wish it understood that I mean any form of metal which partakes of the nature and has the commonly recognized physical characteristics of sheet metal, as distinguished from the common characteristics of castings and forgings.

Where I use the term "relatively soft or ductile metal" I do so by way of description and not by limitation, and it should be expressly understood that in using this term I do not mean to restrict myself to non-ferrous metal, but rather to designate any material possessing pronounced softness as measured by a standard Brinnell testing machine, or ductility as determined by a standard Ehrichsen testing machine. Correspondingly, where I use the term "relatively rigid or hard or non-ductile or unpliant metal" in contradistinction to "ductile metal", I mean to signify any material possessing these characteristics as determined on the Brinnell machine, whether this metal is of the ferrous or non-ferrous group.

It will be understood that when "defects" and disadvantages in my prior rods are spoken of in the foregoing specification that these terms are merely relative, and that for ordinary conditions the previous rods were entirely satisfactory. When used in certain engines, however, I found certain construction features which could be improved upon and the present invention is directed to these improvements.

Having fully described my invention,

What I claim as new and desire to secure by Letters Patent, is:—

1. A connecting rod shell having an apertured end provided with a pin boss; said boss composed of flanged cuffs secured to the sides of the rod shell and around the aperture.

2. A connecting rod shell having an apertured end provided with a pin boss; said boss composed of flanged cuffs secured to the sides of the rod shell and around the aperture, and a liner bushing secured to and uniting the said flanged cuffs.

3. A connecting rod having a head end composed of abutting sheet metal parts, and reinforced by another member of substantially similar profile.

4. A connecting rod having a head end composed of abutting sheet metal parts, and reinforced by another member of substantially similar profile secured therebetween and united thereto.

5. A connecting rod having a hollow head end with substantially parallel spaced side walls, and an end wall uniting the side walls; a bearing seat within the said head end extending from one side wall to the other but spaced from the end wall, and a reinforcement between the said side walls uniting the bearing seat to the end wall.

6. A connecting rod having a hollow apertured head end, a flanged cuff secured to each side wall of the head end, and around the aperture, a reinforcing apertured plate substantially parallel with the side walls and spaced therefrom, a flanged cuff secured to each side of the plate, and a liner bushing within and uniting the several flanged cuffs and forming a bearing seat.

7. A connecting rod having a head end with an apertured pin boss; said pin boss comprising flanged cuffs secured to the sides of the head end and around the aperture, and a liner bushing secured to and uniting the said flanged cuffs.

8. A connecting rod shell comprising a plurality of abutting parts apertured at one end, and flanged cuffs secured thereto forming a pin boss.

9. A sheet metal connecting rod shell having an apertured end, and sheet metal flanged members secured to the sides of said shell and around said aperture forming a pin boss.

10. A connecting rod having a hollow head end, and provided with a pin boss formed partly by members secured to the inner faces of the side walls thereof.

11. A connecting rod having a hollow head end, and provided with a pin boss formed partly by members secured to the inner faces of the side walls thereof, and a liner bushing within and permanently uniting the said members.

12. A connecting rod having a head end, and provided with a pin boss formed partly by members secured to the outer faces of the side walls thereof.

13. A connecting rod having a head end, and provided with a pin boss formed partly by members secured to the outer faces of the side walls thereof, and a liner bushing within and permanently uniting the said members.

14. A connecting rod having a hollow head end, and provided with a pin boss formed by members secured to both the inner and the outer faces of the side walls thereof, and a liner bushing secured within and uniting the flanged members.

15. A connecting rod having a head end provided with a crank pin boss, and provided with bolt bosses to secure a cap in place, and a reinforcement interior to said head end uniting the bolt bosses to the crank boss.

16. A connecting rod having a hollow head end reinforced by an intermediate and apertured reinforcing plate, and a member secured to said apertured plate and co-operating therewith to form a piston pin boss.

17. A connecting rod shell composed of formed sheet metal parts, and having a substantially flat plate reinforcement permanently united therewith.

18. A connecting rod shell composed of relatively soft or ductile or pliable sheet metal parts, and having a substantially flat plate reinforcement of relatively hard or non-ductile or unpliant material permanently united thereto.

19. A connecting rod shell composed of relatively soft or ductile formed sheet metal, with a relatively rigid or hard sheet metal reinforcement of substantially similar profile permanently united thereto.

20. A hollow connecting rod shell composed of formed sheet metal, and having an auxiliary internal reinforcement in the form of a substantially flat plate of sheet metal united therewith.

21. A hollow connecting rod shell composed of relatively soft or ductile formed sheet metal, the shank thereof having an internal auxiliary reinforcement of relatively rigid or hard material permanently united thereto.

22. A hollow connecting rod shell composed of relatively soft or ductile formed sheet metal, and having an internal auxiliary reinforcement of relatively rigid or hard sheet metal permanently united thereto.

23. A connecting rod composed of relatively soft or ductile sheet metal, and having an auxiliary reinforcement of relatively hard or rigid sheet metal united thereto.

24. A connecting rod shell composed of relatively soft or ductile metal, and having an auxiliary shank reinforcement of relatively hard or rigid material.

25. A connecting rod composed of relatively soft or ductile metal, and having an auxiliary reinforcement of substantially similar profile, and of relatively hard or rigid material, united thereto.

26. A connecting rod shell composed of formed sheet aluminum or its alloys, with an auxiliary shank reinforcement of relatively high carbon steel.

27. A connecting rod composed of material having the chief characteristics of low carbon steel, notably ductility, and with an auxiliary shank reinforcement of material having the chief characteristics of high carbon steel, notably rigidity or non-ductility, united thereto.

28. A connecting rod shell composed of non-ferrous metal, and having an auxiliary reinforcement of ferrous metal.

29. A connecting rod having a hollow shell composed of non-ferrous metal, and having an internal auxiliary reinforcement of ferrous metal.

30. A connecting rod shell composed of formed non-ferrous sheet metal, and having an auxiliary reinforcement of ferrous sheet metal.

31. A connecting rod comprising a sheet metal shell and an auxiliary reinforcement of substantially similar profile, one of which is of non-ferrous and the other of ferrous metal.

32. A connecting rod comprising a load-carrying skeleton structure of ferrous sheet metal, fitted with a shell of non-ferrous sheet metal.

33. A connecting rod having a load-carrying skeleton structure, comprising a member provided with piston and crank pin bosses and bolt bosses; the said rod having a sheet metal shell.

34. A connecting rod having a load-carrying skeleton structure, comprising a plate like member of ferrous metal provided with piston and crank pin bosses; said rod having a shell of non-ferrous metal.

35. A connecting rod having a load-carrying skeleton structure, comprising a plate-like member of ferrous sheet metal provided with piston and crank pin bosses and bolt bosses; said rod having a shell of non-ferrous sheet metal.

36. A connecting rod shell having an internal auxiliary reinforcement of substantially similar profile.

In testimony whereof I hereunto affix my signature.

HEBRON BERNARD LAYMAN.